Dec. 27, 1938.  W. A. WHIPPLE  2,142,064
RESPIRATOR
Filed May 29, 1937

Inventor
WILLIS A. WHIPPLE,
By Royal E. Burnham,
Attorney

Patented Dec. 27, 1938

2,142,064

UNITED STATES PATENT OFFICE 2,142,064

RESPIRATOR

Willis A. Whipple, Camp Lake, Wis., assignor to Robert Malcom, Chicago, Ill.

Application May 29, 1937, Serial No. 145,616

4 Claims. (Cl. 128—146)

This invention relates to respirators for removing dusts, smoke, and other solid particles from air to be breathed by the wearer of the device. It is of common practice to employ for cleansing the air of particles filter elements that usually are pads of disc form, which vary in thickness. It periodically is necessary to remove them for cleaning or for replacement by others after they become clogged or reach other condition that results in too much resistance to breathing.

It is an object of the invention to provide means that reliably retains the filter element spaced from and outside of the plate or equivalent base part through which air enters the facepiece of the respirator.

Another object is so to form the parts that the filter element easily may be removed when it has become clogged or otherwise unsuitable for further use and to replace it with another. The structure also permits easy removal of the filter element when the user wishes to talk and its quick return to place at the end of conversation.

Still another object is to provide means whereby filter elements of different thickness may be accommodated and associated with the structure with a tight seal irrespective of thickness.

Further, it is an object so to form the filter structure that the opening thereof through which air passes to the facepiece may be as large as practicable within the limitations of the facepiece itself and the size of the filtering means, so that resistance to breathing comes only from the filter element itself.

The invention also provides means whereby the filter element, when in place, is caused to assume an outwardly convex form.

When considered with the description herein, the characteristics of the invention are apparent in the accompanying drawing, forming part hereof, wherein an adaptation of the invention is disclosed, for purposes of illustration.

Although the disclosures herein exemplify what now is considered to be a preferable embodiment of the invention, it is to be understood that it is not the intention to be limited necessarily thereto in interpretation of the claims, as modifications and adaptations within the limits of the claims can be made without departing from the nature of the invention.

Like reference-characters refer to corresponding parts in the views of the drawing, of which—

Figure 3:
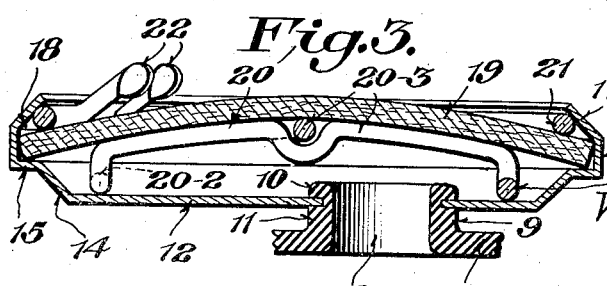
Fig. 3 is a section on the line 3—3, Fig. 2.

The filter structures may be mounted on the facepiece in any suitable manner; for example, as shown in Fig. 3.

The body 6 of the facepiece is made of rubber or other suitable pliable material shaped to contact at its edge with the face of the wearer with a tight fit, so that air is prevented from entering at the place of facial contact. The facepiece has a conventional part 7 containing an exhalation-passage.

The facepiece has in each side an inlet port 8. The material of the facepiece may be formed, at each inlet port, as seen in Fig. 3, with a protrusion 9, having a radially-extending lip or flange 10 at its outer end and a complementary similar lip or flange 11 slightly spaced therefrom.

Figure 1:
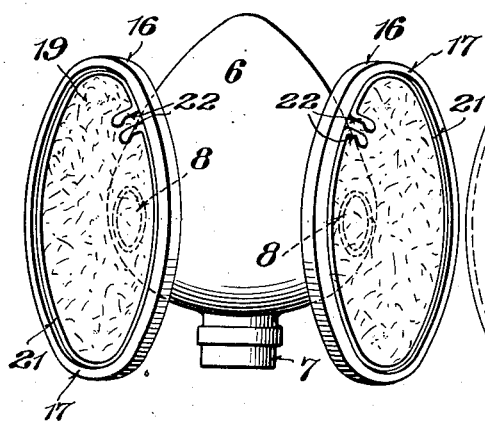
Fig. 1 is a view of a respirator having two of the filter structures of the invention associated therewith.
Figure 4:
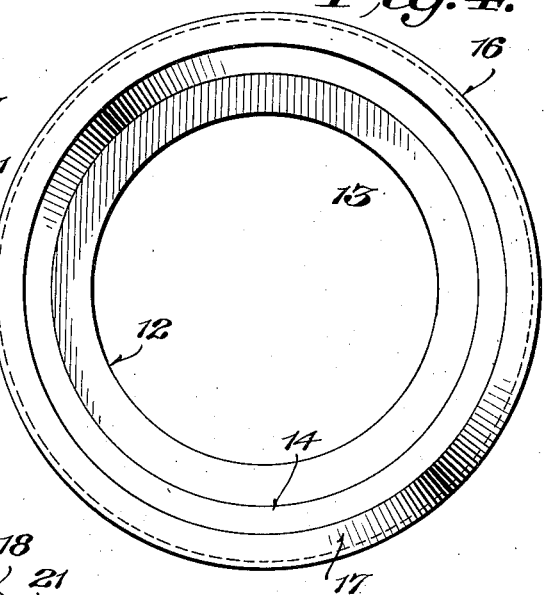
Fig. 4 is a view of the base part of the filter structure.
Figure 2:
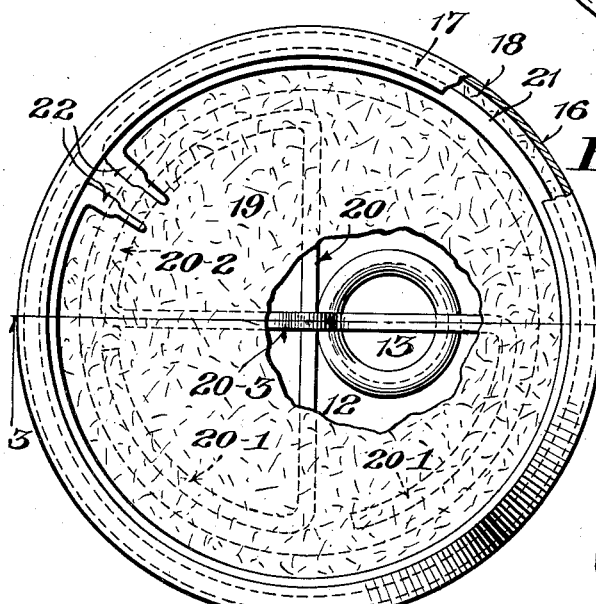
Fig. 2 is a front view of one of the filter structures, part of the retaining flange and also part of the filter element being broken away.
Figure 5:
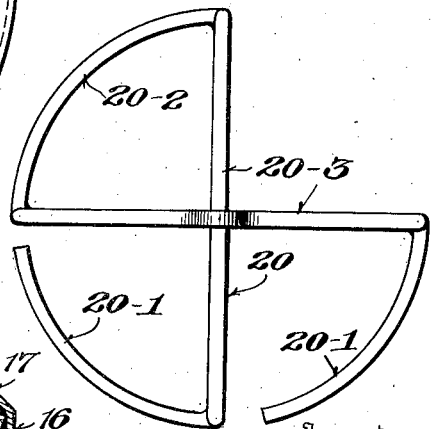
Fig. 5 is a view of the spacer.

Each filter structure preferably is annular, and its body or casing preferably is made of thin and light sheet metal. It comprises a substantially flat plate or base 12 having an opening 13 for passage of air to the facepiece. In some circumstances, this opening may be sufficiently large to give the part 12 the form of a flat ring, as seen in Fig. 4. The protrusion 9 extends into this opening, and the lips 10 and 11 lap opposite sides of the base 12, whereby the filter structure is held to the facepiece. The pliability of the facepiece material permits this association of the filter structure therewith.

The material of which the base 12 is formed is shaped beyond the edge thereof as a rim that constitutes, in sequence, an outwardly-inclined annular part 14, a substantially flat ring 15, a band 16 disposed axially, and an inwardly-extending retaining-flange 17 that is disposed outwardly at an angle to the axial line of the structure. These parts 15, 16, and 17 are walls of a marginal channel 18, in which the edge of a disc pad filter element 19 is disposed, the outwardly-inclined part 14 positioning the channel and thus the edge of the filter element spaced from the base 12.

The filter element, the base, and the parts 15 and 16 are walls of the inhalation-chamber from which air passes to the facepiece. In order to hold the filter element inside of its edge away from the base in an outwardly convex form, to prevent it from being drawn close to or into the passage from the chamber, and thus to keep practically the entire area of the element available for passage of air therethrough, a removable spacer 20 is somewhat loosely positioned in the chamber.

The spacer is annular in outline, and it may be made of round wire, or other suitable elongated material such as rattan or reed. It is formed by bending a single piece of material to constitute at the periphery parts 20—1 that contact in their end portions with the base 12 and thence are disposed outwardly therefrom, an intermediate arcuate peripheral part 20—2 that in its median portion contacts with the base at its ends is disposed away from it, and crossing diametrical or transverse parts 20—3 that are bowed away from the base. The spacer thus, as a whole, is of dome-like form, and it contacts with the base only near the periphery of the latter.

The filter element 19 is held in the channel 18 by a retaining member 21 of split-ring form, having expanding tendency, made of spring wire or other suitable material, which wedges itself under the inclined retaining-flange 17. The end portions of the ring extend inwardly as spaced-apart fingerpieces 22, which when pressed together contract the ring sufficiently for its release from under the flange 17. When the ring thus is released, the filter element may be removed easily for cleaning or replacement by another.

When a filter element is to be associated with the structure, its edge is inserted under the flange 17, the element lies against the spacer, which previously has been put against the base 12, and then the retaining member 21 is snapped into place under the flange and into wedging contact with the element. The retaining member operates to press the element with a tight seal against the flat ring 15. The channel 18 is wide enough to accommodate filter-pads of the greatest thickness ordinarily used. The retaining member 21 exerts wedging action between the pad and the flange 17 and insures a tight seal irrespective of the pad thickness. The bowed parts 20—3 of the spacer cause the filter element to bulge outwardly and to have an outwardly convex form, and the spacer itself is held in place by that element.

The filter element and the base constitute opposite walls of the inhalation-chamber into which air passes through the element and whence it is drawn into the facepiece through its port.

As the material of which the spacer is made is of small transverse dimension, and as the spacer has only a few lengths in contact with the filter element, the area of the element contacted by the spacer likewise is small. Thus there is very slight interference by the spacer with passage of air through the filter element.

As the spacer and base contact only at their peripheries, the opening in the base through which air passes to the facepiece may be as large as practicable within the limitations of the facepiece itself and the size of the filter structure. Accordingly, the opening may be so large as not to afford appreciable breathing resistance.

What I claim as new, and desire to secure by Letters Patent, is—

1. Respirator filter means comprising a base having an opening for passage of air to a facepiece, a filter element mounted adjacent to said base, and a spacer between said base and filter element formed of a single piece of elongated material bent into peripheral parts resting against said base and transverse parts contacting said filter element.

2. Respirator filter means comprising a base having an opening for passage of air to a facepiece, a filter element mounted adjacent to said base, and a spacer between said base and filter element formed of a single piece of elongated material bent into peripheral parts resting against said base and arcuate transverse parts contacting said filter element.

3. Respirator filter means comprising a base having an opening for passage of air to a facepiece and having also a channel, a filter element wedged at its margin in said channel, and a spacer between said base and filter element formed of a single piece of elongated material bent into peripheral parts resting against said base and transverse parts contacting said filter element.

4. Respirator filter means comprising a base having an opening for passage of air to a facepiece and having also an annular channel the outer wall of which is an inclined flange, a filter element disposed at its edge in said channel, a wedging member between said flange and filter element holding the latter in place, and a spacer between said base and filter element formed of a single piece of elongated material bent into peripheral parts resting against said base and transverse parts contacting said filter element.

WILLIS A. WHIPPLE.